United States Patent [19]
Albrodt et al.

[11] Patent Number: 5,212,979
[45] Date of Patent: May 25, 1993

[54] TESTING DEVICE FOR MEASUREMENT OF A LEAK RATE OF A SPRAYING OR INJECTION VALVE

[75] Inventors: Hartmut Albrodt, Tamm; Martin Maier, Moeglingen, both of Fed. Rep. of Germany

[73] Assignee: Robert Bosch GmbH, Stuttgart, Fed. Rep. of Germany

[21] Appl. No.: 739,817

[22] Filed: Aug. 2, 1991

[30] Foreign Application Priority Data

Aug. 18, 1990 [DE] Fed. Rep. of Germany ....... 4026228

[51] Int. Cl.⁵ .......................... G01M 3/02; G01M 3/38
[52] U.S. Cl. ............................................ 73/37; 73/40; 73/46; 356/436
[58] Field of Search ...................... 73/37, 40, 45.1, 45, 73/41, 45.2, 46; 356/436

[56] References Cited

U.S. PATENT DOCUMENTS 3,106,835  10/1963  Henderson .............................. 73/46
3,152,473  10/1964  Emerson ............................. 73/119 A
3,725,052   2/1989  Ronniger ................................ 73/46
3,768,305  10/1973  Pechko ................................ 73/46 X

FOREIGN PATENT DOCUMENTS 1048086  12/1958  Fed. Rep. of Germany .
1245214   7/1967  Fed. Rep. of Germany .
1757996   7/1979  Fed. Rep. of Germany .

Primary Examiner—Hezron E. Williams
Assistant Examiner—Michael Brock
Attorney, Agent, or Firm—Michael J. Striker

[57] ABSTRACT

The testing device for measurement of a hydraulic leak rate of a spraying valve (11) with a closable outlet opening(11B) includes a vessel (10) filled with an indicating liquid (12) and a device for holding the valve to be tested with the outlet opening (11B) in an inclined position pointing downward into the indicating liquid during testing, a riser tube (14) formed as a glass capillary tube connected with the vessel (10), a balancing reservoir (17) also connectable with the vessel (10) but disconnectable from the vessel (10) with a shutoff valve (15), a light source (18) positioned relative to the riser tube (14) so as to illuminate the riser tube (14) and the liquid level (M) in the riser tube (14) and a linear scanning camera (19) positioned relative to the riser tube (14) so as to observe the height (H) of the liquid level (M) in the riser tube for accurate measurement of a change in the height (H) of the liquid level M when the closed valve is pressurized. The leak rate is calculable from the change in height of the liquid level as measured accurately by the linear scanning camera, the cross sectional area of the liquid in the riser tube and the measurement time.

7 Claims, 1 Drawing Sheet

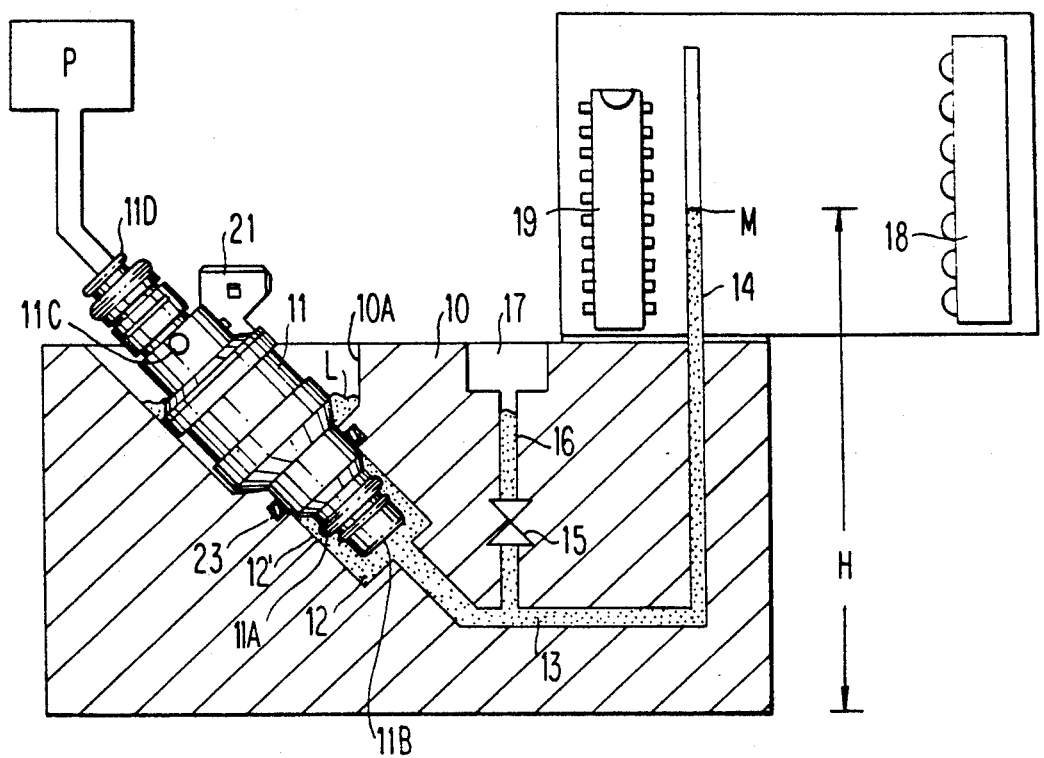

TESTING DEVICE FOR MEASUREMENT OF A LEAK RATE OF A SPRAYING OR INJECTION VALVE

BACKGROUND OF THE INVENTION

The present invention relates to a testing device for an injection or spraying valve.

Testing devices for injection or spraying valves are known. These testing devices determine the hydraulic leak rate of the valve when the valve is closed. A known testing device has a vessel filled with an indicating liquid in which the valve to be tested is inserted with its outlet opening pointing downward into the liquid.

SUMMARY OF THE INVENTION

It is an object of the present invention to provide a testing device for leak testing a spraying or injection valve, whose read out is automatic and accurate.

It is also an object of the present invention to provide a testing device for a spraying or injection valve, which measures the leak rate of the closed valve, without being effected by air trapped in the valve.

According to the invention the testing device has means for holding the valve to be tested in an inclined orientation in the vessel with an at least partially closable outlet opening (which is closed during testing) of the valve pointing down into the liquid. The vessel is connected to a riser tube formed by a glass capillary tube so that the indicating liquid flows into the riser tube and also to a balancing reservoir, which is however disconnectable from the indicating liquid in the vessel by a shutoff valve. A measuring device for accurately determining the height of the level of the indicating liquid in the capillary tube is provided. The vessel is structured so that, when the closed valve is inserted for testing and pressurized, the height of the liquid in the capillary changes as a result of leakage from the closed valve and the change in the height of the level of the indicating liquid is determined by the measuring device. The measuring device includes a light source which illuminates the level of the indicating liquid in the riser tube and a linear scanning camera for measurement of the height of the level of the indicating liquid. The light source and linear scanning camera are located close enough to the riser tube to perform their function properly.

This testing device has the advantage that it is automatically and accurately readable so that an accurate value of the valve leak rate can be obtained. The measuring time is both short and constant, since the measurement can begin immediately when each new initial level of the indicating liquid is set. Air trapped in the valve has no effect on the measurement result.

In a preferred embodiment of the invention, the testing device for measurement of a hydraulic leak rate of a spraying valve comprises a vessel having an upwardly opening cavity at least partly filled with an indicating liquid and formed so that the spraying valve to be tested can be accommodated in the cavity in an inclined orientation with the outlet opening of the valve opening downward; means for holding the spraying valve to be test in an inclined orientation in the cavity and including sealing means for sealing the front portion of the spraying valve to be tested in the cavity to form a closed chamber so that the outlet opening opens downward in the closed chamber; a riser tube held in a fixed relationship relative to the vessel and communicating with the chamber; an open reservoir positioned above the sealing means in the vessel and connectable with the chamber; a shut off valve connected to the reservoir and the chamber so that the reservoir can be connected and disconnected from the chamber by the shut off valve; and a measuring device for accurately measuring a height of a level of the indicating liquid in the riser tube.

BRIEF DESCRIPTION OF THE DRAWING

The objects, features and advantages of the present invention will now be illustrated in more detail by the following detailed description, reference being made to the accompanying drawing in which:

The sole FIGURE is a schematic cross sectional view through a testing device for an injection or spraying valve according to the invention showing a valve being tested.

DETAILED DESCRIPTION OF THE PREFERRED EMBODIMENT

The testing device according to the invention shown in the sole figure includes a vessel 10 having a cavity 10A opening upwardly to the air. A spraying valve 11 to be tested having a front portion or nozzle 11A and a rear portion 11C is held in an inclined position in the cavity 10A by means 21 for holding the valve 11 to be tested. The spraying valve 11 is at least partially closable and has an outlet opening 11B in the front portion 11A and an inlet 11D in the rear portion 11C.

The testing device is also provided with a sealing ring 23 so that, when the valve 11 is held in the inclined position shown in the drawing for testing purposes, the front portion 11A is sealed by the sealing ring 23 so that a closed chamber 12' is formed in which the outlet opening of the valve 11 points downward into the indicating liquid 12. Enough indicating liquid is provided so that the level of the indicating liquid L is above the sealing ring 23.

A transparent, vertically oriented riser tube 14 is connected to the vessel 10 and communicates with the chamber 12' in the vessel by means of a duct 13. The duct 13 is located below the sealing means 23 and the riser tube 14 is a capillary tube in the preferred embodiment. The indicating liquid can therefore flow from the chamber 12' when the valve 11 is being tested and into the riser tube 14 where its level M can be observed.

A balancing reservoir 17 is located in the vessel 10 above the sealing means 23 and is connected to the duct 13 via another duct 16. A shut off valve 15 is located in the other duct 16 so that the balancing reservoir can be connected and disconnected from the chamber 12'. The balancing reservoir 17 is advantageously open to the air.

In the preferred embodiment a measuring device 18,19 for rapid and accurate determination of the liquid level M is provided. This measuring device 18,19 includes a light source 18 positioned adjacent the riser tube 14 and a linear scanning camera 19 also positioned adjacent the riser tube 14 to observe the level M of the indicating liquid 12. The indicating liquid level M in the capillary tube 14 is illuminated by the light source 18 and a change in the height H of the level M is accurately measured with the aid of the linear scanning camera 19.

A source of high pressure P is connected to the inlet of the valve 11 during measurement of its hydraulic leak rate so that a high pressure can be applied to the closed valve 11 to induce liquid to leak through it.

The operation of the testing device is as follows:

The testing device according to the preferred embodiment shown in the drawing measures a hydraulic leak rate. The spraying valve 11 to be tested is mounted and held with the holding means 21 while open with its front portion 11A engaged in the sealing means 23 to form the closed chamber 12'. The shut off valve 15 is open at this point. The initial height of the indicating liquid level M is measured. The high pressure source P is connected to the inlet 11D of the valve 11, pressure is applied to the valve 11, and at the same time the shut off valve 15 is closed. The height of the indicating liquid 12 rises in the riser tube 14, provide there is a leak of sufficient magnitude at the outlet opening 11B of the valve 11. After a certain fixed time interval from the application of pressure to the valve the height of the liquid 12 is again measured. The leak rate can be calculated from the measurement time, the shift of the liquid level in the capillary tube and the cross sectional area of the liquid in the capillary tube.

While the invention has been illustrated and described as embodied in a testing device for a spraying or injection valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A testing device for measurement of a hydraulic leak rate of a spraying valve (11) with an at least partially closable outlet opening (11B), comprising a vessel (10) having a cavity (10A) at least partially filled with an indicating liquid (12), means (21) for holding the spraying valve to be tested in an inclined orientation in the indicating liquid (12) in the cavity (10A) and with the outlet opening (11B) pointing downward, a riser tube (14) communicating with the cavity (10A) of the vessel (10) so that the indicating liquid (12) from the vessel (10) can flow into the riser tube, a balancing reservoir (17) connectable with the cavity (10A) of the vessel (10) to receive indicating liquid (12) therefrom, a shutoff valve (15) for connecting and disconnecting the cavity (10A) and the reservoir (17), and a measuring device (18,19) for accurately measuring a height (H) of a level (M) of the indicating liquid (12) in the riser tube (14).

2. A testing device according to claim 1, wherein said measuring device comprises a light source (18) positioned relative to the riser tube (14) to illuminate the riser tube (14) and the level (M) in the riser tube (14) and a linear scanning camera (19) positioned relative to the riser tube (14) to observe the level (M) of the indicating liquid (12) in the riser tube for accurate measurement of a height (H) of the level (M) of the indicating liquid (12) in the riser tube.

3. A testing device for measurement of a hydraulic leak rate of a spraying valve (11) having a front portion (11A) containing an at least partially closable outlet opening (11B) and a rear portion (11C) containing an inlet (11D) communicating with the at least partially closable outlet opening (11B), said testing device consisting of:

a vessel (10) having an upwardly opening cavity (10A) at least partly filled with an indicating liquid (12), said cavity (10A) being formed so that the spraying valve (11) to be tested can be inserted and accommodated in the cavity (10A) in an inclined orientation with the outlet opening (11B) opening downward;

means for holding the spraying valve (11) to be tested in the inclined orientation in the cavity and including sealing means (23) for sealing the front portion (11A) of the spraying valve (11) to be tested in the cavity (10A) to form a closed chamber (12') so that the outlet opening (11B) opens downward in the closed chamber (12'), the amount of the indicating liquid (12) in the vessel (10) being sufficient to completely fill the chamber (12') and provide an additional portion of the indicating liquid (12) above the chamber (12') in the cavity (10A);

a riser tube (14) held in a fixed relationship relative to the vessel (10) and communicating with the chamber (12');

an open reservoir (17) in said vessel (10) and positioned above the sealing means (23) in said vessel (10), the open reservoir being connectable with the chamber (12');

a shut off valve (15) connected to the reservoir (17) and the chamber (12') so that the reservoir (17) can be connected and disconnected from the chamber by the shut off valve;

a high pressure source (P) connectable to the inlet (11D) of the spraying valve (11) to be tested to apply pressure at the inlet of the spraying valve (11); and a measuring device for accurately measuring a height (H) of a level (M) of the indicating liquid (12) in the riser tube (14).

4. A testing device according to claim 3, wherein said measuring device comprises a light source (18) positioned relative to the riser tube (14) so as to illuminate the riser tube (14) and the level (M) in the riser tube (14) and a linear scanning camera (19) positioned relative to the riser tube (14) so as to observe the level (M) of the liquid in the riser tube (14) for accurate measurement of a height (H) of the level (M) of the indicating liquid (12) in the riser tube (14).

5. A testing device according to claim 3, wherein said vessel (10) is provided with a duct (13) below the sealing means (23) and communicating with the chamber (12'), and the riser tube (14) communicates with the duct (13) and the reservoir is connected with the duct (13) via the shut off valve (15); and wherein the riser tube (14) is connected to and held in the vessel (10).

6. A testing device for measurement of a hydraulic leak rate of a spraying valve (11) having a front portion (11A) containing an at least partially closable outlet opening (11B) and a rear portion (11C) containing an inlet (11D) communicating with the at least partially closable outlet opening (11B), said testing device consisting of:

a vessel (10) having an upwardly opening cavity (10A) at least partly filled with an indicating liquid (12), said cavity (10A) being formed so that the spraying valve (11) to be tested can be inserted and accommodated in the cavity (10A) in an inclined orientation with the outlet opening (11B) opening downward;

means holding the spraying valve (11) to be tested in the inclined orientation in said cavity and including sealing means (23) for sealing the front portion (11A) of the spraying valve (11) in the cavity (10A) to form a chamber (12') so that the outlet opening (11B) opens downward in the chamber (12'), the amount of indicating liquid in the vessel being sufficient to completely fill the chamber (12') and provide an additional portion above the sealing means (23) in the cavity (10A);

a riser tube (14) held in a fixed relationship relative to the vessel (10) and communicating with the chamber (12');

an open reservoir (17) in said vessel (10) and positioned above the sealing means (23) in said vessel (10), the open reservoir being connectable with the chamber (12');

a shut off valve (15) connected to the reservoir (17) and the chamber (12') so that the reservoir (17) can be connected and disconnected from the chamber by the shut off valve;

a high pressure source (P) connectable to the inlet (11D) of the spraying valve (11) to be tested to apply pressure at the inlet of the spraying valve (11); and a measuring device for accurately measuring a height (H) of a level (M) of the indicating liquid (12) in the riser tube (14), the measuring device comprising a light source (18) positioned relative to the riser tube (14) so as to illuminate the riser tube (14) and the level (M) in the riser tube (14) and a linear scanning camera (19) positioned relative to the riser tube (14) so as to observe the level (M) of the liquid in the riser tube (14) for accurate measurement of a height (H) of the level (M) of the indicating liquid (12) in the riser tube (14).

7. A testing device for measurement of a hydraulic leak rate of a spraying valve (11) having a front portion (11A) containing an at least partially closable outlet opening (11B) and a rear portion (11C) containing an inlet (11D) communicating with the at least partially closable outlet opening (11B), said testing device comprising:

a vessel (10) having an upwardly opening cavity (10A) at least partly filled with an indicating liquid (12), said cavity (10A) being formed so that the spraying valve (11) to be tested can be inserted and accommodated in the cavity (10A) in an inclined orientation with the outlet opening (11B) opening downward;

means for holding the spraying valve (11) to be tested in the inclined orientation in said cavity and including sealing means (23) for sealing the front portion (11A) of the spraying valve (11) to be tested in the cavity (10A) to form a closed chamber (12') so that the outlet opening (11B) opens downward in the closed chamber (12'), the amount of the indicating liquid (12) in the vessel (10) being sufficient to completely fill the chamber (12') and provide an additional portion of the indicating liquid (12) above the sealing means (23) in the cavity (10A);

a riser tube (14) held in a fixed relationship relative to the vessel (10) and communicating with the chamber (12');

an open reservoir (17) positioned above the sealing means (23) in said vessel (10), the open reservoir being connectable with the chamber (12');

a shut off valve (15) connected to the reservoir (17) and the chamber (12') so that the reservoir (17) can be connected and disconnected from the chamber by the shut off valve; and a measuring device for accurately measuring a height (H) of a level (M) of the indicating liquid (12) in the riser tube (14).

* * * * *